United States Patent
Friis et al.

(10) Patent No.: US 12,539,150 B2
(45) Date of Patent: Feb. 3, 2026

(54) MODULAR PIEZOELECTRIC INTERMEDULLARY NAIL

(71) Applicant: University of Kansas, Lawrence, KS (US)

(72) Inventors: Elizabeth Annamaria Friis, Lawrence, KS (US); Ember Krech, Lawrence, KS (US); Zachary Pessia, Kalamazoo, MI (US); Craig Cunningham, Arvada, CO (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 198 days.

(21) Appl. No.: 18/265,383

(22) PCT Filed: Dec. 10, 2021

(86) PCT No.: PCT/US2021/072852
§ 371 (c)(1),
(2) Date: Jun. 5, 2023

(87) PCT Pub. No.: WO2022/126130
PCT Pub. Date: Jun. 16, 2022

(65) Prior Publication Data
US 2024/0108383 A1 Apr. 4, 2024

Related U.S. Application Data

(60) Provisional application No. 63/123,541, filed on Dec. 10, 2020.

(51) Int. Cl.
*A61B 17/72* (2006.01)
*A61B 17/00* (2006.01)
*A61B 17/56* (2006.01)

(52) U.S. Cl.
CPC .............. *A61B 17/72* (2013.01); *A61B 17/56* (2013.01); *A61B 2017/00402* (2013.01); *A61B 2017/564* (2013.01); *A61B 2560/04* (2013.01)

(58) Field of Classification Search
CPC .................... A61B 17/72; A61B 17/56; A61B 2017/00402
(Continued)

(56) References Cited

U.S. PATENT DOCUMENTS

| 5,108,398 A | 4/1992 | McQueen et al. |
| 5,489,284 A * | 2/1996 | James ................ A61B 17/8872 606/62 |

(Continued)

FOREIGN PATENT DOCUMENTS

| WO | 2013188380 A1 | 12/2013 |
| WO | 2017062399 A1 | 4/2017 |

(Continued)

OTHER PUBLICATIONS

Craig Cunningham, "Design and Testing of Piezoelectric Intramedullary Nail", Thesis, Issue Date May 31, 2020.
(Continued)

*Primary Examiner* — Jacqueline T Johanas
*Assistant Examiner* — Tara Rose E Carter
(74) *Attorney, Agent, or Firm* — Thomas | Horstemeyer, LLP

(57) ABSTRACT

Examples of modular intermedullary nails are described. In one case, a modular intermedullary nail includes a proximal end component, a distal end component and a modular component. The modular component includes a piezoelectric segment to generate an electric charge based on mechanical stress applied to the modular intermedullary nail. A proximal connector connects the modular component to the proximal end component, and a distal connector
(Continued)

connects the modular component to the distal end component. The intermedullary nail further includes at least one electrode to electrically couple the electric charge to facilitate bone regrowth.

22 Claims, 7 Drawing Sheets

(58) Field of Classification Search
USPC .................................................. 606/62–68
See application file for complete search history.

(56) References Cited

U.S. PATENT DOCUMENTS

| | | | |
|---|---|---|---|
| 6,143,035 A | 11/2000 | McDowell | |
| 7,431,734 B2 | 10/2008 | Danoff et al. | |
| 2003/0040806 A1 | 2/2003 | MacDonald | |
| 2005/0228503 A1 | 10/2005 | Gundolf | |
| 2006/0052782 A1* | 3/2006 | Morgan | A61B 5/14539 606/60 |
| 2006/0190080 A1* | 8/2006 | Danoff | A61F 2/30721 623/17.11 |
| 2008/0300597 A1 | 12/2008 | Morgan et al. | |
| 2010/0318085 A1* | 12/2010 | Austin | A61B 17/8004 606/62 |

FOREIGN PATENT DOCUMENTS

| | | |
|---|---|---|
| WO | 2019195264 A1 | 10/2019 |
| WO | 2021052356 A1 | 3/2021 |

OTHER PUBLICATIONS

ISR Mailed May 3, 2022; International Patent Application PCT/US2021/072852 Filed Dec. 10, 2021.

* cited by examiner

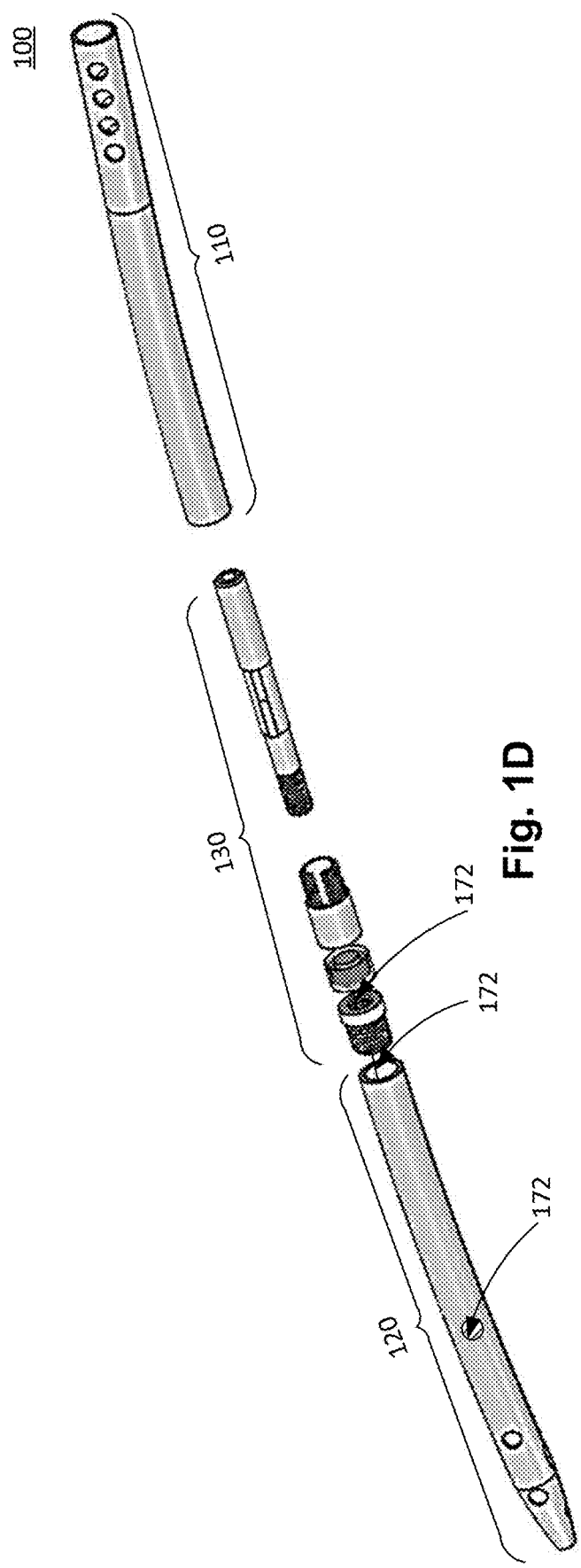

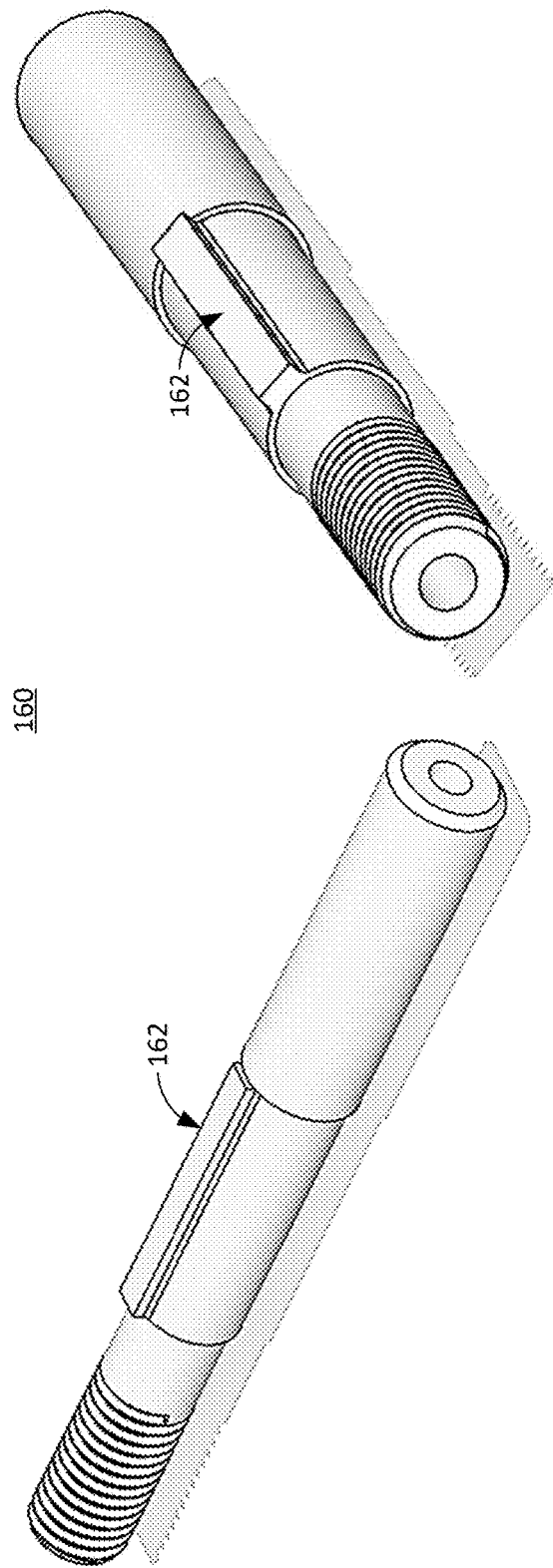
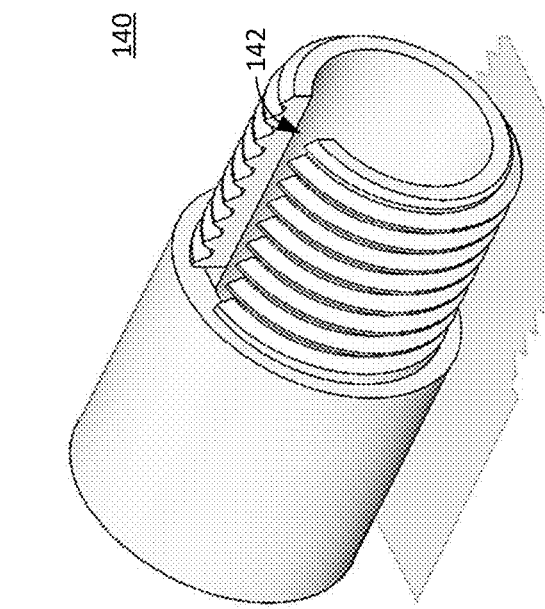
Fig. 2A
Fig. 2B
Fig. 2C

MODULAR PIEZOELECTRIC INTERMEDULLARY NAIL

CROSS-REFERENCE TO RELATED APPLICATIONS

This application is the 35 U.S.C. § 371 national stage of PCT application having serial number PCT/US2021/072852, filed on Dec. 10, 2021. This application also claims priority to U.S. provisional application having Ser. No. 62/123,541 filed on Dec. 10, 2020, which are entirely incorporated herein by reference.

BACKGROUND

Intermedullary nails are medical implants that are used to stabilize long bone. In approximately 10% of procedures using an intermedullary nail for stabilization of long bone fractures, there is a delay or nonunion of the fracture, resulting in added cost of expensive adjunct therapies to help the bone heal as well as revision surgeries.

SUMMARY

Embodiments of the present disclosure provide devices for facilitating bone regrowth and the like.

An embodiment of the present disclosure includes a modular intermedullary nail which can include a proximal end component, a distal end component, and a modular component comprising a piezoelectric segment to generate an electric charge based on mechanical stress applied to the modular intermedullary nail. A proximal connector can connect the modular component to the proximal end component and a distal connector can connect the modular component to the distal end component. The modular intermedullary nail can also include signal processing circuitry and at least one electrode to electrically couple the electric charge to facilitate bone regrowth.

An embodiment of the present disclosure also includes a modular piezoelectric component for an intermedullary nail, comprising at least one piezoelectric element encapsulated in a biocompatible electrically-isolating material.

An embodiment of the present disclosure also includes a method of healing a bone fracture by inserting a modular intermedullary nail as above into the medullary cavity of a fractured bone in a patient. The method can further include positioning the at least one electrode adjacent to an area of the bone in need of healing and compressing the slide rod through physiological compression created by the patient placing compressive load on the bone through physical activity. The method can further include loading the piezoelectric elements from the compressive load on the slide rod and delivering electrical stimulation from the piezoelectric elements to the area of the bone via the electrode.

Other compositions, apparatus, methods, features, and advantages will be or become apparent to one with skill in the art upon examination of the following drawings and detailed description. It is intended that all such additional compositions, apparatus, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIG. 1D shows an example of the modular intermedullary nail having an electrode connected from the piezoelectric segment and continuing through the distal connector accordance with embodiments of the present disclosure.

FIGS. 2A and 2B show an example of a slide rod in accordance with embodiments of the present disclosure.

FIG. 2C shows an example of a proximal connector in accordance with embodiments of the present disclosure.

FIGS. 3A-3D include example measurements for aspects of the slide rod.

FIGS. 3E-3F include example measurements for aspects of the distal connector.

FIGS. 3G-3I include example measurements for aspects of the proximal connector.

Figure 1A:
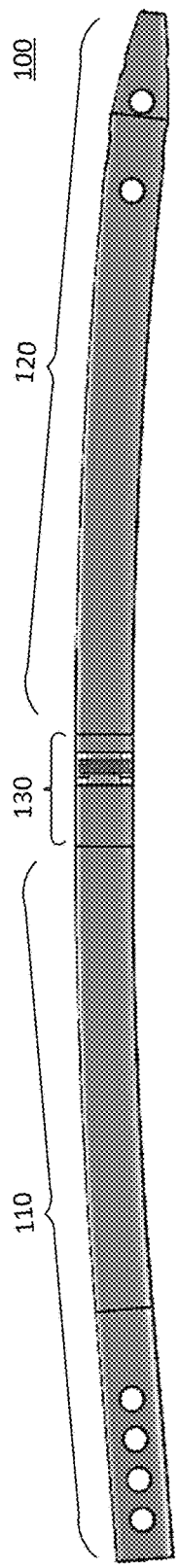
FIG. 1A shows an example of a modular intermedullary nail in accordance with embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

In accordance with the purpose(s) of the present disclosure, as embodied and broadly described herein, embodiments of the present disclosure, in some aspects, relate to modular intermedullary nails including piezoelectric elements.

In general, embodiments of the present disclosure provide devices that include piezoelectric elements for stimulating bone healing and methods of healing fractures. The present disclosure includes a modular intermedullary (IM) nail. The modular intermedullary nail, also known in the art as an intermedullary rod, can include a proximal end component, a distal end component, and a modular piezoelectric component (MPC) between the two. The two end components can be provided in various lengths, such that the modular piezoelectric component can be fitted at the section of the nail closest to the fracture site. The modular component can include a piezoelectric segment to generate an electric charge based on mechanical stress applied to the modular intermedullary nail. The MPC can be connected to the proximal end component via a proximal connector and to the distal end component via a distal connector. Also included is at least one electrode to electrically couple the electric charge to the bone to facilitate bone regrowth.

Advantageously, the piezoelectric element(s) in the piezoelectric segment accumulate or generate electric charge from the motion of a patient in which modular intermedullary nail (hereinafter the device or the IM nail) is implanted. When the device receives compressive force along the long axis of the device, the piezoelectric element accumulates or generates electric charge, which can then be applied or transmitted to the bone at one or more fracture sites to stimulate osteogenesis and accelerate healing. For example, when implanted for a femoral fracture, the force of the patient walking can cause the electrical stimulation to be delivered to the fracture site. As the bone heals and becomes stable, the device will no longer receive compressive force due to the surrounding bone having the strength to do so. In the absence of the force on the device, the electrical stimulation will cease being delivered to the repaired bone.

In various embodiments, the piezoelectric elements can be made from suitable materials, such as PZT-based ceramics, barium titanate, polyvinylidene fluoride, quartz, or any composite material containing piezoelectric elements. The piezoelectric elements can also be encapsulated in a biocompatible electrically-isolating material and electrically isolated from the proximal end component and the distal end component. The electrically-isolating material can be such as a medical grade epoxy, or any biocompatible polymer (e.g. polyether ether ketone (PEEK) or high density polyethylene (HDPE), etc.). In addition to the biocompatible electrically-isolating material, the piezoelectric elements can also be enclosed in a titanium or cobalt chromium sleeve. Titanium as used herein can refer to commercially pure titanium and other titanium alloys. Cobalt chromium may also be included in the piezoelectric segments. The piezoelectric elements are not in direct contact with the bone and can be enclosed in a titanium or cobalt chromium sleeve to insulate them from the other device components.

Multiple piezoelectric elements can be stacked in the piezoelectric segment. In some embodiments, the piezoelectric elements have an aperture (e.g. be ring shaped), and a slide rod can pass through the piezoelectric elements as described in further detail below. In some embodiments, the piezoelectric elements can be inside a rod. In some embodiments, no aperture is present in the piezoelectric elements.

The device can further include a first electrode on an outer surface of the piezoelectric segment and an extension wire for coupling to a second electrode on at least one of the proximal end component and the distal end component. The sleeve described above can also function as the negative electrode. Alternatively, the negative electrode can be a wire.

Because the modular piezoelectric segment is not permanently affixed to the proximal and distal end components, a location of the MPC along the IM nail can be tailored or adjusted to correspond with a bone fracture location. For example, the lengths of the proximal and distal end components can be selected such that the MPC is located more proximally or distally along the length of the device to correspond with a particular location along the bone shaft where the fracture is present. As used herein, the terms proximal or proximally and distal or distally are relative terms. The term proximal or proximally references a location situated closer to the origin of a bone or the center of the body, and the term distal or distally references a location situated further from the origin of a bone or the center of the body, unless otherwise specified.

In some embodiments, the modular piezoelectric component includes a slide rod. The slide rod has a smaller diameter than the interior diameter of the hollow proximal end component. At the proximal end, the slide rod inserts into the shaft of the proximal end component. At its distal end, the slide rod inserts through the proximal end connector to allow contact with the piezoelectric segment, then connects with internal threads of the distal connector. The slide rod can insert through the piezoelectric electric element.

In some embodiments, the piezoelectric elements are loaded by physiological compression of the IM nail, such as when a patient implanted with the device walks or otherwise adds weight bearing compression to the bone containing the implant.

In some embodiments, the slide rod and/or proximal connector are configured to prevent torsion. In one such embodiment, the slide rod includes a protrusion or key. The proximal connector includes a complementary cutout or slot for the key on the slide rod. The key fits into the cutout, preventing torsion of the slide rod and limiting the force sent to the piezoelectric segment by the slide rod to compressive force. The slide rod and/or proximal and distal end components can also have an aperture to accommodate a surgical guidewire to aid in fitting the device to a patient.

In various embodiments, the modular IM nail can be made from cobalt chromium, titanium, or other biocompatible materials having yield strength, tensile strength, and wear properties suitable for a surgical bone implant as can be appreciated by one of ordinary skill in the art.

Thus, the embodiments of the present disclosure include an MPC for an IM nail as above, wherein the MPC includes at least one piezoelectric element encapsulated in a biocompatible, electrically-isolating material. The biocompatible electrically-isolating material can be an epoxy in one example. In some embodiments, the piezoelectric element can be encapsulated in a titanium sleeve. Advantageously, the MPC can be used in conjunction with variable lengths of intermedullary nails or segments of modular intermedullary nail rods. In some embodiments, more than one MPC can be used in an intermedullary nail.

The at least one piezoelectric segment can include an aperture for a slide rod. A negative electrode or multiple negative electrodes can transmit the energy from the piezoelectric elements to the bone, such that the piezoelectric element is isolated from contact with the bone. The piezoelectric element generates an electric charge based on mechanical stress applied to the modular intermedullary nail via compressive force delivered to the slide rod in physical communication with the piezoelectric segment. In another embodiment, such as when a patient is non-weight bearing, the piezoelectric element can be activated through mechanical loading via the application of external ultrasound. The MPC can also include a proximal end connector and a distal end connector.

In other aspects, the MPC can include signal conditioning circuitry coupled to both a negative electrode (e.g. a titanium electrode) and a positive electrode. The positive electrode is electrically isolated from the negative electrode. The negative electrode can be connected to the external side of the MPC so that the negative electrode is in close proximity to the fracture site to deliver energy to the bone. The positive electrode can be in the form of a wire extending from the MPC and electrically coupled to the internal side of either the proximal or distal end components to complete the circuit. In other embodiments, the proximal and/or distal components can serve as the positive electrode.

Embodiments of the present disclosure also include methods of healing a fracture or promoting osteogenesis in a patient in need thereof. The examples focus on the device configured for fractures of the long bones (femur, tibia, humerus). The devices described in the examples can be adapted as a rod absent the inner shaft for a guide wire, which can be suitable for smaller long bones (e.g. fibula, radius, ulna). Additionally, it can be envisioned that the modular component and the piezoelectric system described herein can be modified to be used in the treatment of other fracture sites in which micromotion of a patient can generate piezoelectric energy, such as ischial, spinal, or mandibular fractures.

Figure 1B:
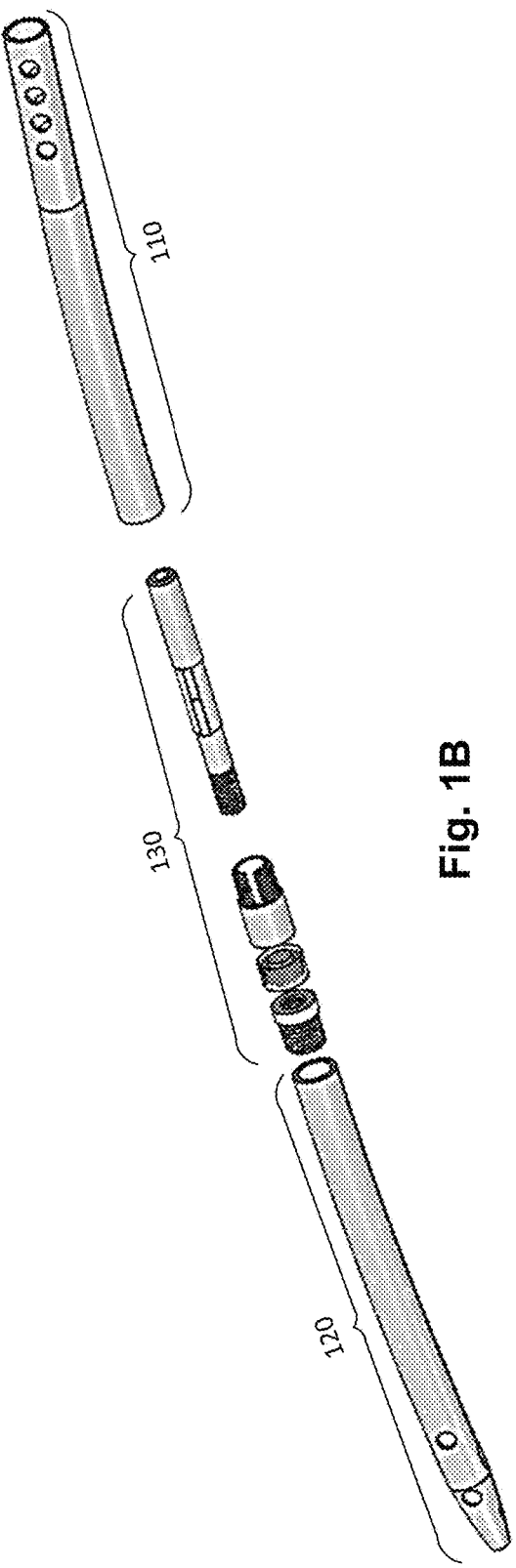
FIG. 1B shows an exploded view of the modular intermedullary nail shown in FIG. 1A, in accordance with embodiments of the present disclosure.

Turning now to the figures, FIG. 1A shows a view of an assembled modular intermedullary nail 100. FIG. 1B shows an exploded view of the modular intermedullary nail 100 of FIG. 1A. The intermedullary nail 100 is illustrated as a representative example in FIG. 1A, for the purposes of discussion. The intermedullary nail 100 is not necessarily drawn to scale in FIG. 1A, and the concepts described herein are not limited to any particular size or shape of intermedullary nail. As shown in FIG. 1A, the intermedullary nail 100 includes a proximal end component 110, a distal end component 120, and a modular piezoelectric component (MPC) 130. The proximal end component 110 and the distal end component 120 are connected by the modular piezoelectric component (MPC) 130.

In one example, the proximal end component 110 and the distal end component 120 can be formed from cobalt chromium or titanium, although other materials can be relied upon. Additionally, the proximal end component 110 and the distal end component 120 can be formed to any suitable length, size, and proportion depending upon the use case such that the modular piezoelectric component can be fitted at the section of the nail closest to the fracture site. In one example, shorter end components can be used to fit a patient of smaller stature. In another example, a short proximal end component 110 with a longer distal end component 120 could be used to in the instance of a proximally located fracture to enable the MPC 130 to be optimally placed near the fracture site.

As described above, the IM nail 100 includes a proximal end component 110, a distal end component 120, and an MPC 130 between the two. The MPC can be connected to the proximal end component 110 via a proximal connector 140 and to the distal end component via a distal connector 150. The MPC 130 can include a piezoelectric segment 135 to generate an electric charge based on mechanical stress applied to the modular IM nail 100. Also included is at least one electrode to electrically couple the electric charge to the bone to facilitate bone regrowth. The piezoelectric element(s) in the piezoelectric segment 135 accumulate or generate electric charge from the motion of a patient in which the IM nail 100 is implanted. When the IM nail 100 receives force along the long axis of the device, the piezoelectric element accumulates or generates electric charge, which can then be applied or transmitted to the bone from the piezoelectric segment 135 at one or more fracture sites to stimulate osteogenesis and accelerate healing.

Proximal end component 110 and distal end component 120 can include holes for bone screws and can be used in conjunction with bone plates, in the same manner as traditional, non-modular IM nails. The shown embodiment is a femoral modular IM nail, wherein the proximal end component 110 and distal end component 120 are hollow to allow for insertion into the bone with a surgical guidewire. As described above, alternative embodiments may have a non-hollow proximal and/or distal end components.

Figure 1C:
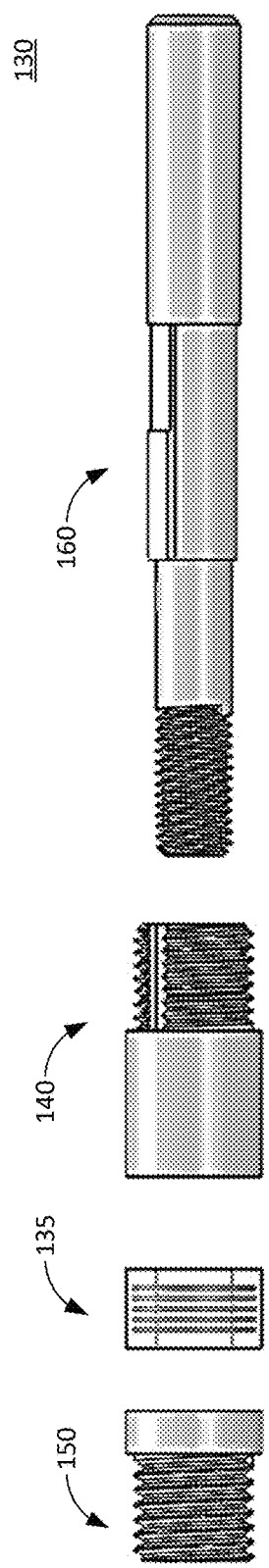
FIG. 1C shows an example of a modular piezoelectric component in accordance with embodiments of the present disclosure.

FIG. 1C provides an exploded view of the MPC 130. The MPC 130 includes a piezoelectric segment 135, a proximal connector 140, a distal connector 150, and a slide rod 160. In one example, the piezoelectric segment 135 can include one or more piezoelectric elements enclosed or encapsulated within an insulating material such as epoxy, a titanium sleeve, or insulating material within a titanium sleeve. The piezoelectric segment 135 of the MPC 130 can include at one or more negative electrodes to deliver electric stimulation from piezoelectric segment 135 to bone. The negative electrodes can be formed on or at an outer surface of the piezoelectric segment 135.

The slide rod 160 has a proximal segment having a diameter smaller than that of the interior diameter of proximal end component 110 such that it can slidably insert into both proximal end component 110 and proximal connector 140. The most distal segment of the slide rod 160 is threaded and has a diameter small enough to insert into the interior of the distal connector 150. When the intermedullary nail 100 is assembled, the distal end of slide rod 160 passes through both the proximal connector 140 and piezoelectric element 135 connect by threads to the interior of distal connector 150.

FIG. 1D shows an example of positive electrode 172 connected from the piezoelectric element 135 and continuing internally through the distal connector 150 to couple to the interior of the distal end component 120 (connection illustrated by dashed circle). As described above, the positive electrode is electrically isolated from all metal components in contact with bone. In other embodiments, the positive electrode 172 can connect to the interior of the proximal end component 110.

FIGS. 2A and 2B show perspective views of an example of the slide rod 160 from the proximal end (2A) and the distal end (2A). In the shown embodiment, slide rod 160 includes a key 162. Key 162 is a protrusion that fits into a cutout or key channel 142 on proximal connector 140 (FIG. 2C) to prevent torsion when the slide rod moves and/or to transfer torsional forces to compressive forces on the piezoelectric component. Proximal connector 140 includes threads for connection to the interior of proximal end component 110. In other embodiments (not shown), the key 162 can be integral to the slide rod, such as an extruded section, or some permutation of a rod with a flat.

Figure 2D:
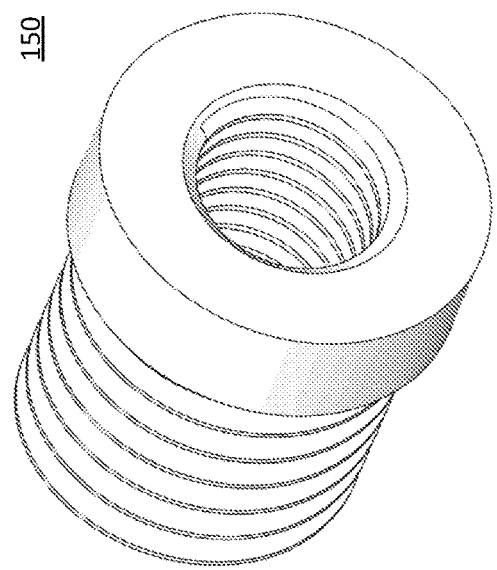
FIG. 2D shows an example of a distal connector in accordance with embodiments of the present disclosure.

FIG. 2D shows a perspective view of the distal connector 150 from the proximal end, the distal connector 150 having internal threads to accept the slide rod 160 and external threads to connect the MPC 130 assembly to distal end component 120.

FIGS. 3A-3H show examples of components of a modular piezoelectric component, including example measurements for a device appropriate for femoral insertion in accordance with embodiments of the present disclosure. As can be appreciated by one of ordinary skill in the art, the measurements described herein may be modified according to the particular needs of a patient or for a device intended for another area of the body, such as a tibia, humerus, etc. Accordingly, as described above, alternative embodiments may omit the central aperture.

Figure 3A:
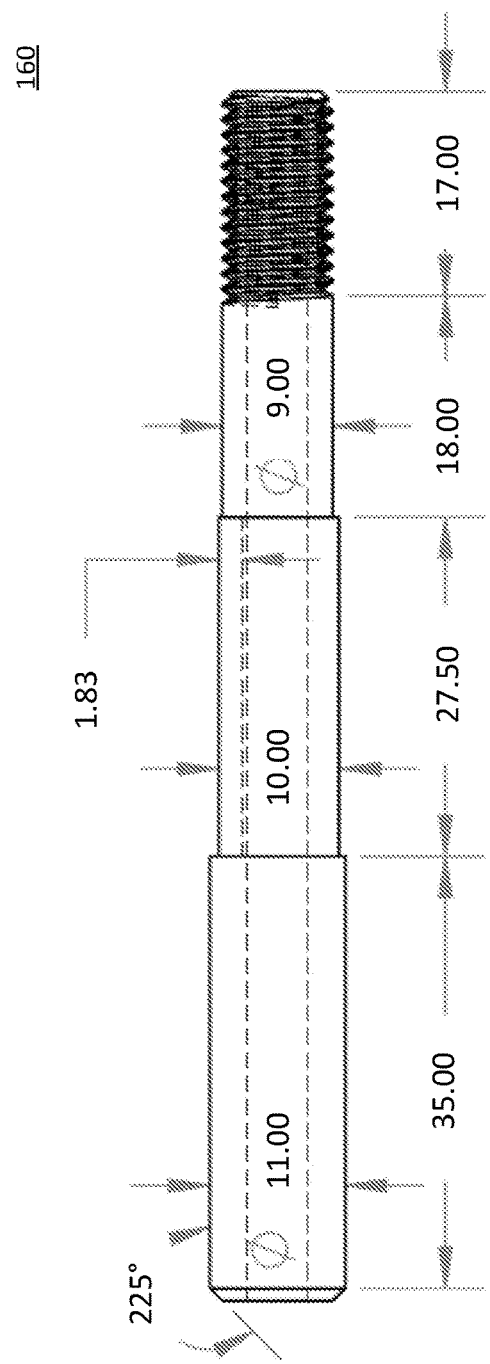
FIGS. 3A-3I show examples of components of a modular piezoelectric component, including example measurements for a device appropriate for femoral insertion in accordance with embodiments of the present disclosure.
Figure 3B:
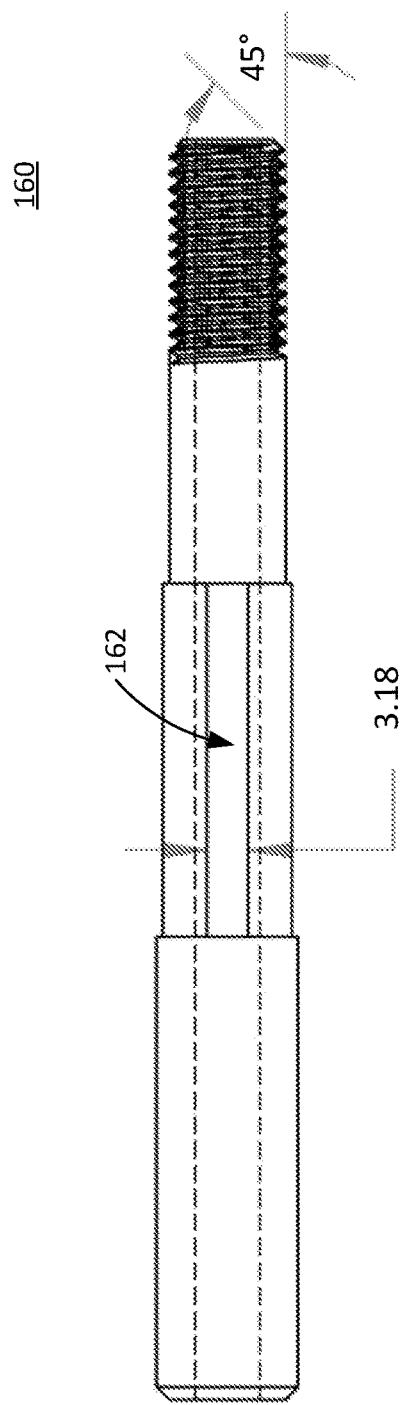
Figure 3D:
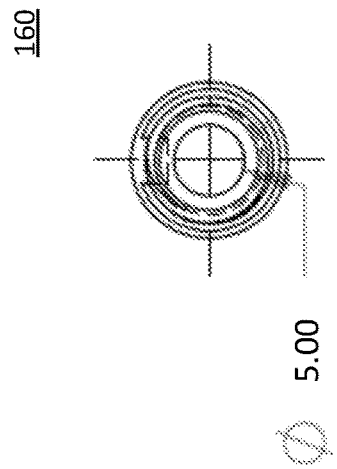
Figure 3C:
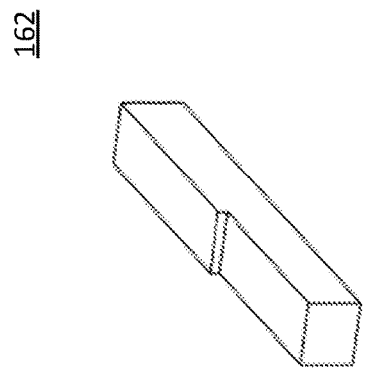

FIGS. 3A-3C include example measurements for aspects of the slide rod 160. The slide rod can be segmented with each segment having a decreasing diameter from proximal to distal. In this embodiment, the slide rod has a proximal segment, a middle segment, and a distal segment having a threaded portion (FIG. 3A). In the depicted embodiment, the proximal segment is shouldered to allow removal in case of rod failure. The middle segment guides proximal connector 140 to slide and resist rotation. The distal segment has a threaded portion that can connect to the distal rod and an unthreaded portion to decrease wear on the piezo component where compression is transferred. The most proximal segment can have an exterior diameter of about 11.00 mm and a length of about 35.00 mm, and have a beveled rim to eliminate sharp edges with an angle of about 225°, the middle segment can have an exterior diameter of about 10.00 mm and a length of about 27.50 mm, the distal segment can have an exterior diameter of about 9.00 mm and a length of about 18.00 mm, and the threaded segment can have an exterior diameter of about 9.00 mm and a length of about 17.00 mm. The middle segment a can have a key 162 corresponding to the key channel 142 on proximal connector 140. The key 162 can have a width of about 3.18 mm and a length approximately the same as the middle segment (FIG. 3B). In some embodiments, the key can be stepped (FIG. 3C). In some embodiments the key may also be incorporated into part 160 as an extrusion or flat. The threaded segment can have a beveled edge with an angle of about 45°, and an internal radius of about 5.00 mm (FIG. 3D). The thread pitch can be about M9×1.5.

Figure 3F:
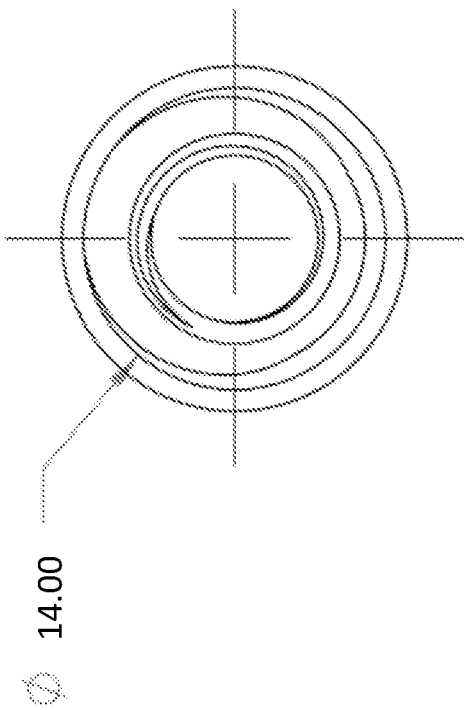
Figure 3E:
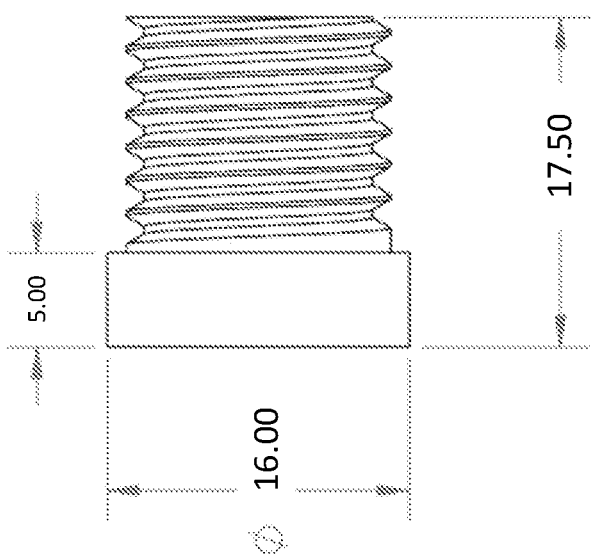

FIGS. 3E-3F include example measurements for portions of the distal connector 150. The distal connector 150 can have a body portion and a threaded portion, the threaded portion having both internal and external threads, as shown in FIG. 3E. The overall length of distal connector 150 can be about 17.5 mm. The body can have a length of about 5.00 mm and an external diameter of about 16.00. The internal threads to accept the slide rod 160 can have a thread pitch of about M 9×1.5 and the external threads to connect the MPC 130 assembly to distal end component 120 can have a thread pitch of about M 9×1.5 and the internal diameter of the threaded portion can be about 14.00 mm (FIG. 3F).

Figure 3G:
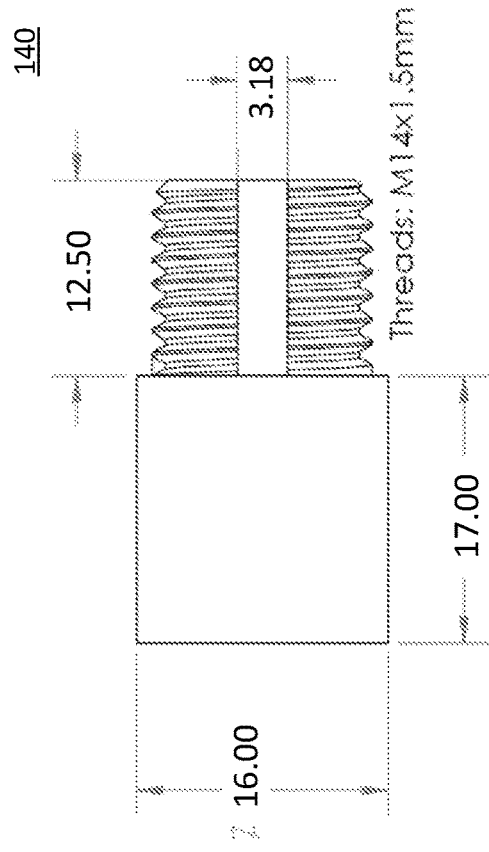
Figure 3I:
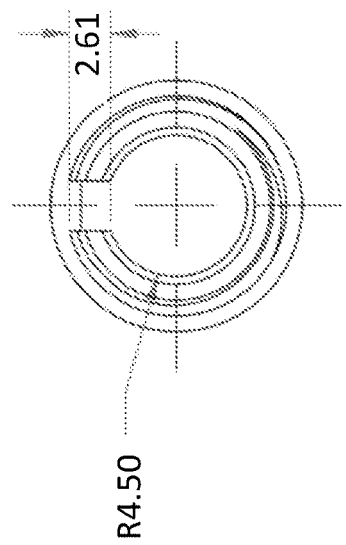
Figure 3H:
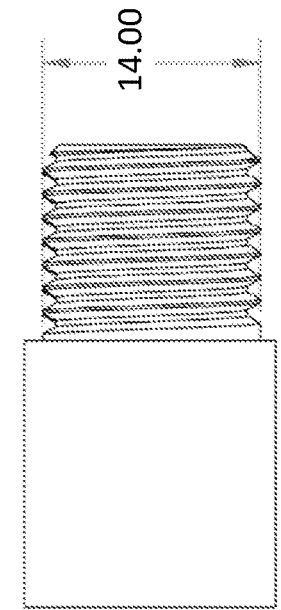

FIGS. 3G-3I include example measurements for aspects of the proximal connector. In this example (FIG. 3G), the main body of the proximal connector 140 can have an exterior diameter of about 16.00 mm and a length of about 17.00 mm. The threaded portion can have an exterior diameter of about 14.00 mm (FIG. 3H) and a length of about 12.50 mm. The width of the cutout can correspond to the width of the key 162 on the slide rod 160, which in this embodiment is about 3.18 mm. The threads can have a thread pitch of about M 14×1.5 mm. The aperture threaded portion can have an internal radius of about 4.50 mm (FIG. 3I).

Aspects of the Disclosure

The present disclosure will be better understood upon reading the following numbered aspects, which should not be confused with the claims. Any of the numbered aspects below can, in some instances, be combined with aspects described elsewhere in this disclosure and such combinations are intended to form part of the disclosure.

Aspect 1. A modular intermedullary nail, comprising: a proximal end component; a distal end component; a modular component comprising a piezoelectric segment to generate an electric charge based on mechanical stress applied to the modular intermedullary nail, a proximal connector connecting the modular component to the proximal end component, and a distal connector connecting the modular component to the distal end component, signal processing circuitry; and at least one electrode to electrically couple the electric charge to facilitate bone regrowth.

Aspect 2. The modular intermedullary nail of aspect 1, wherein the piezoelectric segment comprises at least one piezoelectric element encapsulated in a biocompatible electrically-isolating material.

Aspect 3. The modular intermedullary nail of aspect 1 or 2, wherein the piezoelectric segment comprises a first electrode on an outer surface of the piezoelectric segment and an extension wire for coupling to a second electrode on at least one of the proximal end component and the distal end component.

Aspect 4. The modular intermedullary nail of any of aspects 1, 2, or 3, wherein a location of the modular component can be adjusted to correspond with a bone fracture location.

Aspect 5. The modular intermedullary nail of any of aspects 1-4, wherein the modular component further comprises a slide rod.

Aspect 6. The modular intermedullary nail of any of aspects 1-5, wherein the piezoelectric segment is loaded and generates the electric charge by physiological compression of the modular component.

Aspect 7. The modular intermedullary nail of any of aspects 1-6, wherein the slide rod is mechanically connected to the proximal end component.

Aspect 8. The modular intermedullary nail of any of aspects 1-7, wherein: the proximal connector comprises a key channel; and the slide rod comprises a key, wherein torsion of the slide rod is prevented when the key channel is in communication with the key.

Aspect 9. The modular intermedullary nail of any of aspects 1-7, wherein: the proximal connector comprises a channel; and the slide rod comprises a flat portion, wherein torsion of the slide rod is prevented when the flat portion is in communication with the channel.

Aspect 10. The modular intermedullary nail of any of aspects 1-10, wherein the modular intermedullary nail is formed from cobalt chromium alloy, titanium, or a titanium alloy.

Aspect 11. The modular intermedullary nail of any of aspects 1-11, wherein the piezoelectric segment comprises a sleeve, wherein the sleeve comprises titanium or a titanium alloy.

Aspect 12. The modular intermedullary nail of any of aspects 1-11, wherein the modular intermedullary nail is a femoral modular intermedullary nail.

Aspect 13. The modular intermedullary nail of any of aspects 1-11, wherein the modular intermedullary nail is a tibial modular intermedullary nail.

Aspect 14. The modular intermedullary nail of any of aspects 1-11, wherein the modular intermedullary nail is a humoral modular intermedullary nail.

Aspect 15. The modular intermedullary nail of any of aspects 1-14, wherein the at least one piezoelectric element is connected to the slide rod and the distal end component by the distal connector.

Aspect 16. The modular intermedullary nail of any of aspects 1-15, wherein the distal connector comprises internal threads to receive the slide rod and external threads to connect to the distal end component.

Aspect 17. A modular piezoelectric component for an intermedullary nail, comprising at least one piezoelectric element encapsulated in a biocompatible electrically-isolating material.

Aspect 18. The modular piezoelectric component of aspect 17, wherein the at least one piezoelectric element comprises an aperture for a slide rod.

Aspect 19. The modular piezoelectric component of aspect 17 or 18, wherein the at least one piezoelectric element is encapsulated in a titanium sleeve.

Aspect 20. The modular piezoelectric component of aspect 19, wherein the at least one piezoelectric element is encapsulated in an insulated material inside the titanium sleeve and wherein a wire connects the encapsulated piezoelectric element to the titanium sleeve.

Aspect 21. The modular piezoelectric component of any of aspects 17-20, wherein the at least one piezoelectric element receives energy from compressive force delivered to a slide rod in physical communication with the piezoelectric element.

Aspect 22. The modular piezoelectric component of any of aspects 17-21, further comprising a negative electrode.

Aspect 23. A method of healing a bone fracture, comprising: inserting a modular intermedullary nail according to claim 1 into the medullary cavity of a fractured bone in a patient; positioning the at least one electrode adjacent to an area of the bone in need of healing; compressing the slide rod through physiological compression created by the patient placing compressive load on the bone through physical activity; loading the piezoelectric elements from the compressive load on the slide rod; and delivering electrical stimulation from the piezoelectric elements to the area of the bone via the electrode.

Aspect 24. The method of aspect 23, wherein the slide rod ceases to receive physiological compression from the patient when the area of bone has healed, thereby preventing further delivery of electrical stimulation to the area of bone.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that measurements, amounts, and other numerical data can be expressed herein in a range format. It is also understood that there are a number of values disclosed herein, and that each value is also herein disclosed as "approximately" that particular value in addition to the value itself. For example, if the value "10" is disclosed, then "approximately 10" is also disclosed. Similarly, when values are expressed as approximations, by use of the antecedent "approximately," it will be understood that the particular value forms a further aspect. For example, if the value "approximately 10" is disclosed, then "10" is also disclosed.

As used herein, the terms "about," "approximately," "at or about," and "substantially equal" can mean that the amount or value in question can be the exact value or a value that provides equivalent results or effects as recited in the claims or taught herein. That is, it is understood that amounts, sizes, measurements, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In general, an amount, size, measurement, parameter or other quantity or characteristic is "about," "approximate," "at or about," or "substantially equal" whether or not expressly stated to be such. It is understood that where "about," "approximately," "at or about," or "substantially equal" is used before a quantitative value, the parameter also includes the specific quantitative value itself, unless specifically stated otherwise.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

What is claimed is:

1. A modular intermedullary nail, comprising:
   a proximal end component;
   a distal end component;
   a modular component comprising a piezoelectric segment to generate an electric charge based on mechanical stress applied to the modular intermedullary nail, a proximal connector connecting the modular component to the proximal end component, and a distal connector connecting the modular component to the distal end component, signal processing circuitry, wherein the piezoelectric segment comprises at least one piezoelectric element encapsulated in a biocompatible electrically-isolating material, and the at least one piezoelectric element comprises an aperture for a slide rod; and
   at least one electrode to electrically couple the electric charge to facilitate bone regrowth.

2. The modular intermedullary nail of claim 1, wherein the piezoelectric segment comprises a first electrode on an outer surface of the piezoelectric segment and an extension wire for coupling to a second electrode on at least one of the proximal end component and the distal end component.

3. The modular intermedullary nail of claim 1, wherein a location of the modular component can be adjusted to correspond with a bone fracture location.

4. The modular intermedullary nail of claim 1, wherein the modular component further comprises the slide rod, and wherein the at least one piezoelectric element is connected to the slide rod and the distal end component by the distal connector.

5. The modular intermedullary nail of claim 4, wherein the piezoelectric segment is loaded and generates the electric charge by physiological compression of the modular component.

6. The modular intermedullary nail of claim 4, wherein the slide rod is mechanically connected to the proximal end component.

7. The modular intermedullary nail of claim 4, wherein:
   the proximal connector comprises a key channel; and the slide rod comprises a key, wherein torsion of the slide rod is prevented when the key channel is in communication with the key.

8. The modular intermedullary nail of claim 4, wherein:
   the proximal connector comprises a channel; and
   the slide rod comprises a flat portion, wherein torsion of the slide rod is prevented when the flat portion is in communication with the channel.

9. The modular intermedullary nail of claim 1, wherein the modular intermedullary nail is formed from cobalt chromium alloy, titanium, or a titanium alloy.

10. The modular intermedullary nail of claim 1, wherein the piezoelectric segment comprises a sleeve, wherein the sleeve comprises titanium or a titanium alloy.

11. The modular intermedullary nail of claim 1, wherein the modular intermedullary nail is selected from a femoral modular intermedullary nail, a tibial modular intermedullary nail, and a humoral modular intermedullary nail.

12. A modular piezoelectric component for an intermedullary nail, comprising at least one piezoelectric element encapsulated in a biocompatible electrically-isolating material, wherein the at least one piezoelectric element comprises an aperture for a slide rod.

13. The modular piezoelectric component of claim 12, wherein the at least one piezoelectric element is encapsulated in a titanium sleeve.

14. The modular piezoelectric component of claim 12, further comprising a negative electrode.

15. A modular piezoelectric component for an intermedullary nail, comprising at least one piezoelectric element encapsulated in a biocompatible electrically-isolating material, wherein the at least one piezoelectric element is encapsulated in a titanium sleeve, and the at least one piezoelectric element is encapsulated in an insulated material inside the titanium sleeve and wherein a wire connects the encapsulated at least one piezoelectric element to the titanium sleeve.

16. The modular piezoelectric component of claim 15, further comprising a negative electrode.

17. A modular piezoelectric component for an intermedullary nail, comprising at least one piezoelectric element encapsulated in a biocompatible electrically-isolating material, wherein the at least one piezoelectric element receives energy from compressive force delivered to a slide rod in physical communication with the at least one piezoelectric element.

18. The modular piezoelectric component of claim 17, further comprising a negative electrode.

19. The modular piezoelectric component of claim 17, wherein the at least one piezoelectric element is encapsulated in a titanium sleeve.

20. A method of healing a bone fracture, comprising:
   inserting a modular intermedullary nail into a medullary cavity of a fractured bone in a patient, the modular intermedullary nail comprising:
   a proximal end component;
   a distal end component;
   a modular component comprising a piezoelectric segment to generate an electric charge based on mechanical stress applied to the modular intermedullary nail, a proximal connector connecting the modular component to the proximal end component, and a distal connector connecting the modular component to the distal end component, signal processing circuitry; and
   at least one electrode to electrically couple the electric charge to facilitate bone regrowth;

positioning the at least one electrode adjacent to an area of the bone in need of healing;

compressing a slide rod through physiological compression created by the patient placing compressive load on the bone through physical activity;

loading piezoelectric elements from the compressive load on the slide rod; and delivering electrical stimulation from the piezoelectric elements to the area of the bone via the at least one electrode.

21. The method of claim 20, wherein the slide rod ceases to receive physiological compression from the patient when the area of bone has healed, thereby preventing further delivery of electrical stimulation to the area of bone.

22. The method of claim 20, wherein the piezoelectric segment comprises at least one piezoelectric element encapsulated in a biocompatible electrically-isolating material, and the at least one piezoelectric element comprises an aperture for the slide rod.

* * * * *